(12) United States Patent
Naserian et al.

(10) Patent No.: US 12,122,409 B2
(45) Date of Patent: Oct. 22, 2024

(54) SYSTEM AND METHOD FOR ENHANCING OCCUPANT AWARENESS

(71) Applicant: GM Global Technology Operations LLC, Detroit, MI (US)

(72) Inventors: Mohammad Naserian, Windsor (CA); Allan Kenneth Lewis, Windsor (CA)

(73) Assignee: GM GLOBAL OPERATIONS LLC, Detroit, MI (US)

( * ) Notice: Subject to any disclaimer, the term of this patent is extended or adjusted under 35 U.S.C. 154(b) by 38 days.

(21) Appl. No.: 18/152,841

(22) Filed: Jan. 11, 2023

(65) Prior Publication Data
US 2024/0227835 A1    Jul. 11, 2024

(51) Int. Cl.
*B60W 50/14*     (2020.01)
*G06V 20/56*     (2022.01)

(52) U.S. Cl.
CPC ............ *B60W 50/14* (2013.01); *G06V 20/56* (2022.01); *B60W 2050/146* (2013.01); *B60W 2420/403* (2013.01); *B60W 2554/80* (2020.02)

(58) Field of Classification Search
CPC .......... G08G 1/16; G08G 1/165; G08G 1/166; G01C 21/32; G01C 21/34; G01C 21/36; G05D 1/00; G05D 1/0088; G05D 1/02; G05D 1/0221; B60W 30/09; B60W 30/16
See application file for complete search history.

(56) References Cited

U.S. PATENT DOCUMENTS

| | | | | |
|---|---|---|---|---|
| 9,546,876 | B2* | 1/2017 | Kleve | G01C 21/34 |
| 11,645,779 | B1* | 5/2023 | Pertsel | G06V 20/58 |
| | | | | 382/104 |
| 2017/0101056 | A1* | 4/2017 | Park | G08G 1/162 |
| 2019/0317522 | A1* | 10/2019 | Yang | G05D 1/0278 |
| 2020/0254928 | A1* | 8/2020 | Monteiro | B60Q 9/00 |
| 2021/0009115 | A1* | 1/2021 | Ohmura | B60T 8/92 |
| 2023/0128034 | A1* | 4/2023 | Keshipeddy | B60Q 9/008 |
| | | | | 342/70 |

OTHER PUBLICATIONS

NPL Search (May 3, 2024).*
Xu, et al. "Research on Monocular Vision Distance Measurement Algorithm Based on Reference Target," 2019 IEEE 4th International Conference on Signal and Image Processing (ICSIP), 2019, pp. 192-197.

* cited by examiner

*Primary Examiner* — Van T Trieu
(74) *Attorney, Agent, or Firm* — Vivacqua Crane, PLLC

(57) ABSTRACT

A system for enhancing occupant awareness for a vehicle includes a display for displaying information to the occupant of the vehicle and a controller in electrical communication with the display. The controller is programmed to determine an activation state of the system. The activation state includes an activated state and a deactivated state. The controller is further programmed to determine a clearance distance between the vehicle and an object in an environment surrounding the vehicle in response to determining that the activation state is the activated state. The controller is further programmed to display a notification to the occupant of the vehicle based at least in part on the clearance distance.

17 Claims, 3 Drawing Sheets

SYSTEM AND METHOD FOR ENHANCING OCCUPANT AWARENESS

INTRODUCTION

The present disclosure relates to systems and methods for increasing occupant awareness for a vehicle, and more particularly to enhancing occupant awareness when maneuvering the vehicle in low-width environments.

To increase occupant awareness and convenience, vehicles may be equipped with side-view mirrors and/or side-view cameras. However, side-view mirrors and/or side-view cameras may protrude from the side of the vehicle, increasing the width of the vehicle. Therefore, when maneuvering the vehicle in low-width environments (e.g., alleyways, garages, carports, and the like), there is a risk that the side-view mirrors and/or side-view cameras may impact objects in the environment. The side-view mirrors and/or side-view cameras may be configured to fold to decrease the width of the vehicle. However, occupants may be unaware of low-width environments, and thus fail to fold the side-view mirrors and/or side-view cameras.

Thus, while current systems and methods for folding side-view mirrors and/or side-view cameras achieve their intended purpose, there is a need for a new and improved system and method for increasing occupant awareness for a vehicle.

SUMMARY

According to several aspects, a system for enhancing occupant awareness for a vehicle is provided. The system includes a display for displaying information to the occupant of the vehicle and a controller in electrical communication with the display. The controller is programmed to determine an activation state of the system. The activation state includes an activated state and a deactivated state. The controller is further programmed to determine a clearance distance between the vehicle and an object in an environment surrounding the vehicle in response to determining that the activation state is the activated state. The controller is further programmed to display a notification to the occupant of the vehicle based at least in part on the clearance distance.

In another aspect of the present disclosure, to determine the activation state of the system, the controller is further programmed to determine a speed of the vehicle. To determine the activation state of the system, the controller is further programmed to compare the speed of the vehicle to a predetermined vehicle speed threshold. To determine the activation state of the system, the controller is further programmed to determine the activation state of the system to be the activated state in response to determining that the speed of the vehicle is less than or equal to the predetermined vehicle speed threshold.

In another aspect of the present disclosure, the system further includes a global navigation satellite system (GNSS) for determining a geographical location of the vehicle. The GNSS is in electrical communication with the controller. To determine the clearance distance, the controller is further programmed to determine the geographical location of the vehicle using the GNSS. To determine the clearance distance, the controller is further programmed to determine a save status of the clearance distance in a non-transitory memory of the controller based on the geographical location of the vehicle. The save status includes a saved status and an unsaved status. To determine the clearance distance, the controller is further programmed to retrieve the clearance distance from the non-transitory memory of the controller in response to determining that the save status is the saved status.

In another aspect of the present disclosure, the system further includes a ranging sensor system for measuring distances. The ranging sensor system is in electrical communication with the controller. To determine the clearance distance, the controller is further programmed to measure the clearance distance using the ranging sensor system in response to determining that the saved status is the unsaved status.

In another aspect of the present disclosure, the ranging sensor system includes a side-view camera affixed to a side-view mirror of the vehicle. To measure the clearance distance, the controller is further programmed to capture a first image of the environment surrounding the vehicle using the side-view camera. To measure the clearance distance, the controller is further programmed to determine the clearance distance based at least in part on the first image.

In another aspect of the present disclosure, the ranging sensor system includes a front-view camera affixed to a front of the vehicle. To measure the clearance distance, the controller is further programmed to capture a second image of the environment surrounding the vehicle using the front-view camera. To measure the clearance distance, the controller is further programmed to determine the clearance distance based on at least one of the first image and the second image.

In another aspect of the present disclosure, the controller is further programmed to save the clearance distance determined using the ranging sensor system and the corresponding geographical location of the vehicle in the non-transitory memory of the controller.

In another aspect of the present disclosure, to display the notification to the occupant of the vehicle, the controller is further programmed to compare the clearance distance to a predetermined minimum clearance distance threshold. To display the notification to the occupant of the vehicle, the controller is further programmed to display the notification to the occupant of the vehicle in response to determining that the clearance distance is less than or equal to the predetermined minimum clearance distance threshold.

In another aspect of the present disclosure, the controller is further programmed to fold at least one of a side-view mirror and a side-view camera of the vehicle in response to determining that the clearance distance is less than or equal to the predetermined minimum clearance distance threshold.

In another aspect of the present disclosure, the controller is further programmed to provide an audible warning to the occupant of the vehicle in response to determining that the clearance distance is less than or equal to the predetermined minimum clearance distance threshold.

According to several aspects, a method for enhancing occupant awareness for a vehicle is provided. The method includes determining an activation state. The activation state includes an activated state and a deactivated state. The method also includes determining a clearance distance between the vehicle and an object in an environment surrounding the vehicle in response to determining that the activation state is the activated state. The method also includes displaying a notification to the occupant of the vehicle based at least in part on the clearance distance.

In another aspect of the present disclosure, determining the activation state further may include determining a speed of the vehicle. Determining the activation state further may include comparing the speed of the vehicle to a predetermined vehicle speed threshold. Determining the activation state further may include determining the activation state to be the activated state in response to determining that the speed of the vehicle is less than or equal to the predetermined vehicle speed threshold.

In another aspect of the present disclosure, determining the clearance distance further may include determining a geographical location of the vehicle using a GNSS. Determining the clearance distance further may include determining a save status of the clearance distance in a non-transitory memory of a controller based on the geographical location of the vehicle. The save status includes a saved status and an unsaved status. Determining the clearance distance further may include retrieving the clearance distance from the non-transitory memory of the controller in response to determining that the save status is the saved status. Determining the clearance distance further may include measuring the clearance distance using a ranging sensor system in response to determining that that save status is the unsaved status.

In another aspect of the present disclosure, the method further includes saving the clearance distance determined using the ranging sensor system and the corresponding geographical location of the vehicle in the non-transitory memory of the controller.

In another aspect of the present disclosure, the ranging sensor system includes a camera system. The camera system includes at least one of a side-view camera and a front-view camera.

In another aspect of the present disclosure, displaying the notification to the occupant of the vehicle further may include comparing the clearance distance to a predetermined minimum clearance distance threshold. Displaying the notification to the occupant of the vehicle further may include and displaying the notification to the occupant of the vehicle in response to determining that the clearance distance is less than or equal to the predetermined minimum clearance distance threshold.

In another aspect of the present disclosure, the method further may include folding at least one of a side-view mirror and a side-view camera of the vehicle in response to determining that the clearance distance is less than or equal to the predetermined minimum clearance distance threshold. The method further may include providing an audible warning to the occupant of the vehicle in response to determining that the clearance distance is less than or equal to the predetermined minimum clearance distance threshold.

According to several aspects, a system for enhancing occupant awareness for a vehicle is provided. The system includes a display for displaying information to the occupant of the vehicle. The system also includes a global navigation satellite system (GNSS) for determining a geographical location of the vehicle. The system also includes a ranging sensor system for measuring distances. The system also includes a controller in electrical communication with the display, the GNSS, and the ranging sensor system. The controller is programmed to determine a speed of the vehicle. The controller is further programmed to compare the speed of the vehicle to a predetermined vehicle speed threshold. The controller is further programmed to determine an activation state of the system to be an activated state in response to determining that the speed of the vehicle is less than or equal to the predetermined vehicle speed threshold. The controller is further programmed to determine a clearance distance between the vehicle and an object in an environment surrounding the vehicle in response to determining that the activation state is the activated state. The controller is further programmed to compare the clearance distance to a predetermined minimum clearance distance threshold. The controller is further programmed to display a notification to the occupant of the vehicle in response to determining that the clearance distance is less than or equal to the predetermined minimum clearance distance threshold.

In another aspect of the present disclosure, to determine the clearance distance, the controller is further programmed to determine a geographical location of the vehicle using a GNSS. To determine the clearance distance, the controller is further programmed to determine a save status of the clearance distance in a non-transitory memory of the controller based on the geographical location of the vehicle. The save status includes a saved status and an unsaved status. To determine the clearance distance, the controller is further programmed to retrieve the clearance distance from the non-transitory memory of the controller in response to determining that the save status is the saved status. To determine the clearance distance, the controller is further programmed to measure the clearance distance using a ranging sensor system in response to determining that that save status is the unsaved status. To determine the clearance distance, the controller is further programmed to save the clearance distance determined using the ranging sensor system and the corresponding geographical location of the vehicle in the non-transitory memory of the controller in response to measuring the clearance distance.

In another aspect of the present disclosure, the controller is further programmed to fold at least one of a side-view mirror and a side-view camera of the vehicle in response to determining that the clearance distance is less than or equal to the predetermined minimum clearance distance threshold.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

When maneuvering a vehicle in a low-width environment (e.g., alleyways, garages, carports, and the like), obstacles in the environment may present a hazard to the vehicle, especially to components of the vehicle which protrude from the main body of the vehicle (e.g., side-view mirrors, side-view cameras, and the like). Using the system and method of the present disclosure, the occupant of the vehicle is warned of potential for impact of the side-view mirrors and/or side-view cameras with obstacles in the environment, increasing occupant awareness and convenience.

Figure 1:
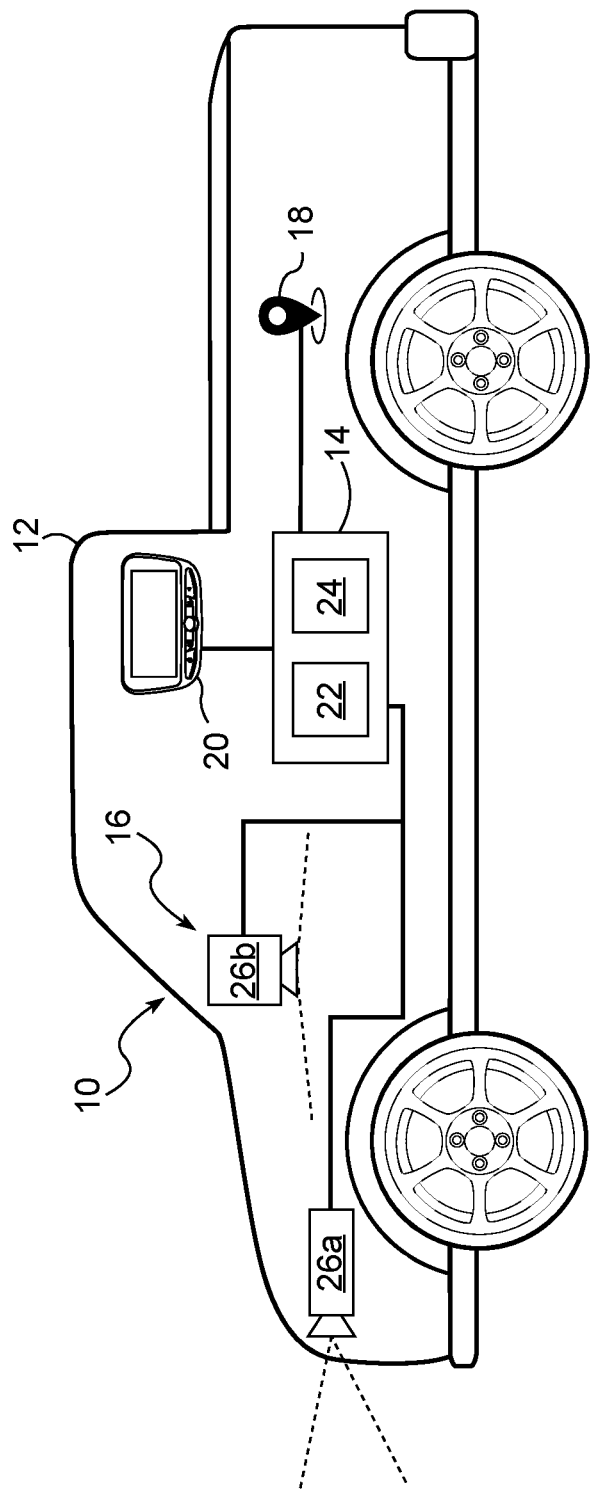
FIG. 1 is a schematic diagram of a system for enhancing occupant awareness for a vehicle according to an exemplary embodiment.

Referring to FIG. 1, a system for enhancing occupant awareness for a vehicle is illustrated and generally indicated by reference number 10. The system 10 is shown with an exemplary vehicle 12. While a utility vehicle is illustrated, it should be appreciated that the vehicle 12 may be any type of vehicle without departing from the scope of the present disclosure. The system 10 generally includes a controller 14, a ranging sensor system 16, a global navigation satellite system (GNSS) 18, and a display 20.

The controller 14 is used to implement a method 100 for enhancing occupant awareness for a vehicle, as will be described below. The controller 14 includes at least one processor 22 and a non-transitory computer readable storage device or media 24. The processor 22 may be a custom made or commercially available processor, a central processing unit (CPU), a graphics processing unit (GPU), an auxiliary processor among several processors associated with the controller 14, a semiconductor-based microprocessor (in the form of a microchip or chip set), a macroprocessor, a combination thereof, or generally a device for executing instructions. The computer readable storage device or media 24 may include volatile and nonvolatile storage in read-only memory (ROM), random-access memory (RAM), and keep-alive memory (KAM), for example. KAM is a persistent or non-volatile memory that may be used to store various operating variables while the processor 22 is powered down. The computer-readable storage device or media 24 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 14 to control various systems of the vehicle 12. The controller 14 may also consist of multiple controllers which are in electrical communication with each other. The controller 14 may be inter-connected with additional systems and/or controllers of the vehicle 12, allowing the controller 14 to access data such as, for example, speed, acceleration, braking, and steering angle of the vehicle 12.

The controller 14 is in electrical communication with the ranging sensor system 16, the global navigation satellite system (GNSS) 18, and the display 20. In an exemplary embodiment, the electrical communication is established using, for example, a CAN bus, a Wi-Fi network, a cellular data network, or the like. It should be understood that various additional wired and wireless techniques and communication protocols for communicating with the controller 14 are within the scope of the present disclosure.

The ranging sensor system 16 is used to measure a distance between the vehicle 12 and an object in an environment surrounding the vehicle 12. In the exemplary embodiment depicted in FIG. 1, the ranging sensor system 16 is a surround view camera system including a plurality of cameras (also known as satellite cameras) arranged to provide a view of the environment adjacent to all sides of the vehicle 12. In a non-limiting example, the camera system 16 includes a front-facing camera 26a, a first side-view camera 26b, and a second side-view camera (not shown). In a non-limiting example, the first side-view camera 26b and the second side-view camera (not shown) have a field-of-view of approximately 180°, such that an entire side of the vehicle 12 is in view of the side-view cameras (e.g., 26b). Use of alternative and/or additional ranging sensors, such as, for example, LiDAR sensors, ultrasonic ranging sensors, radar sensors, time-of-flight sensors, and/or cameras is within the scope of the present disclosure. The ranging sensor system 16 is in electrical communication with the controller 14 as described above.

It should be understood that surround view camera systems having a different number of cameras and/or different mounting locations are within the scope of the present disclosure. It should further be understood that cameras having various sensor types including, for example, charge-coupled device (CCD) sensors, complementary metal oxide semiconductor (CMOS) sensors, and/or high dynamic range (HDR) sensors are within the scope of the present disclosure. Furthermore, cameras having various lens types including, for example, wide-angle lenses and/or narrow-angle lenses are also within the scope of the present disclosure.

The GNSS 18 is used to determine a geographical location of the vehicle 12. In an exemplary embodiment, the GNSS 18 is a global positioning system (GPS). In a non-limiting example, the GPS includes a GPS receiver antenna (not shown) and a GPS controller (not shown) in electrical communication with the GPS receiver antenna. The GPS receiver antenna receives signals from a plurality of satellites, and the GPS controller calculates the geographical location of the vehicle 12 based on the signals received by the GPS receiver antenna. In an exemplary embodiment, the GNSS 18 additionally includes a map. The map includes information about infrastructure such as municipality borders, roadways, railways, sidewalks, buildings, and the like. Therefore, the geographical location of the vehicle 12 is contextualized using the map information. In a non-limiting example, the map is retrieved from a remote source using a wireless connection. In another non-limiting example, the map is stored in a database of the GNSS 18. It should be understood that various additional types of satellite-based radionavigation systems, such as, for example, the Global Positioning System (GPS), Galileo, GLONASS, and the BeiDou Navigation Satellite System (BDS) are within the scope of the present disclosure. The GNSS 18 is in electrical communication with the controller 14 as described above.

The display 20 is used to provide information to an occupant of the vehicle 12. In the scope of the present disclosure, the occupant includes a driver and/or a passenger of the vehicle 12. In the exemplary embodiment depicted in FIG. 1, the display 20 is a human-machine interface (HMI) located in view of the occupant and capable of displaying text, graphics and/or images. It is to be understood that HMI display systems including LCD displays, LED displays, and the like are within the scope of the present disclosure. Further exemplary embodiments where the display 20 is disposed in a rearview mirror are also within the scope of the present disclosure. In another exemplary embodiment, the display 20 includes a head-up display (HUD) configured to provide information to the occupant by projecting text, graphics, and/or images upon the windscreen of the vehicle 12. The text, graphics, and/or images are reflected by the windscreen of the vehicle 12 and are visible to the occupant without looking away from a roadway ahead of the vehicle 12. In another exemplary embodiment, the display 20 includes an augmented reality head-up display (AR-HUD). The AR-HUD is a type of HUD configured to augment the occupant's vision of the roadway ahead of the vehicle 12 by overlaying text, graphics, and/or images on physical objects in the environment surrounding the vehicle 12 within a field-of-view of the occupant. In an exemplary embodiment, the display 20 further includes a loudspeaker for providing audible feedback to the occupant. In yet another exemplary embodiment, the occupant may interact with the display 20 using a human-interface device (HID), including, for example, a touchscreen, an electromechanical switch, a capacitive switch, a rotary knob, and the like. It should be understood that additional systems for displaying information to the occupant of the vehicle 12 are also within the scope of the present disclosure. The display 20 is in electrical communication with the controller 14 as described above.

Figure 2:
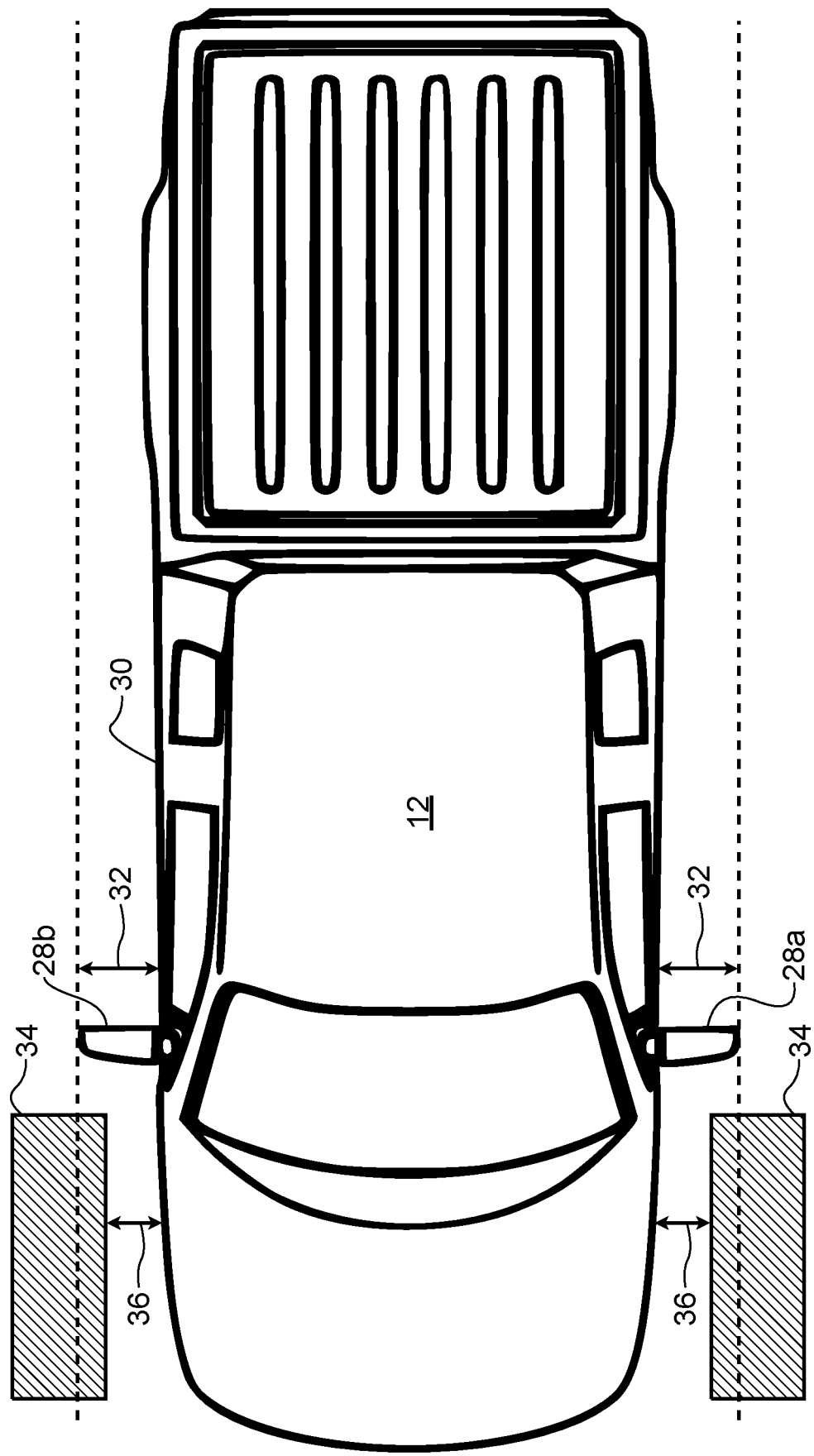
FIG. 2 is a schematic view of a vehicle in an exemplary low-width environment according to an exemplary embodiment.

Referring to FIG. 2 with continued reference to FIG. 1, a schematic view of the vehicle 12 in an exemplary low-width environment is shown. The vehicle 12 is equipped with a first side-view mirror 28a and a second side-view mirror 28b. In an exemplary embodiment, the first side-view camera 26b is affixed to the first side-view mirror 28a and the second side-view camera (not shown) is affixed to the second side-view mirror 28b.

The first side-view mirror 28a is equipped with a first side-view mirror movement motor (not shown). The second side-view mirror 28b is equipped with second side-view mirror movement motor (not shown). The first and second side-view mirror movement motors are electric motors which are configured to move the first and second side-view mirrors 28a, 28b between a folded state and an unfolded state. In the folded state, the first and second side-view mirrors 28a, 28b are positioned to minimize a distance by which the first and second side-view mirrors 28a, 28b protrude from a main body 30 of the vehicle 12. Thus, in the folded state, risk of collision between the first and second side-view mirrors 28a, 28b and objects in the environment is reduced. In the unfolded state (shown in FIG. 2), the first and second side-view mirrors 28a, 28b are positioned to provide the occupant with a view of an area behind the vehicle 12. In an exemplary embodiment, the first and second side-view mirror movement motors are in electrical communication with the controller 14. Therefore, the controller 14 may switch the first and second side-view mirrors 28a, 28b between the folded state and the unfolded state using the first and second side-view mirror movement motors.

It should be understood that in an alternative exemplary embodiment, the first and second side-view mirrors 28a, 28b may be replaced with side-view cameras as allowed, for example, by U.N. Regulation No. 46 (UN-ECE-R46) without departing from the scope of the present disclosure.

The first and second side-view mirrors 28a, 28b protrude from the main body 30 of the vehicle 12 by a predetermined minimum clearance distance 32. The predetermined minimum clearance distance 32 is saved in the media 24 of the controller 14. The predetermined minimum clearance distance 32 may vary among different vehicle models and/or based on trims, options packages, and the like equipped on the vehicle 12.

In the exemplary embodiment depicted in FIG. 2, an obstacle 34 is shown near the vehicle 12. In a non-limiting example, obstacle 34 may be a garage door opening, a narrow alleyway, a carport opening, or the like. The obstacle 34 is separated from the main body 30 of the vehicle 12 by a clearance distance 36. In the scope of the present disclosure, the clearance distance 36 is a distance between the obstacle 34 and the main body 30 of the vehicle 12.

Therefore, as exemplified in FIG. 2, if the clearance distance 36 of the obstacle 34 is less than or equal to the predetermined minimum clearance distance 32, the obstacle 34 may impact one of the first and second side-view mirrors 28a, 28b of the vehicle 12.

Figure 3:
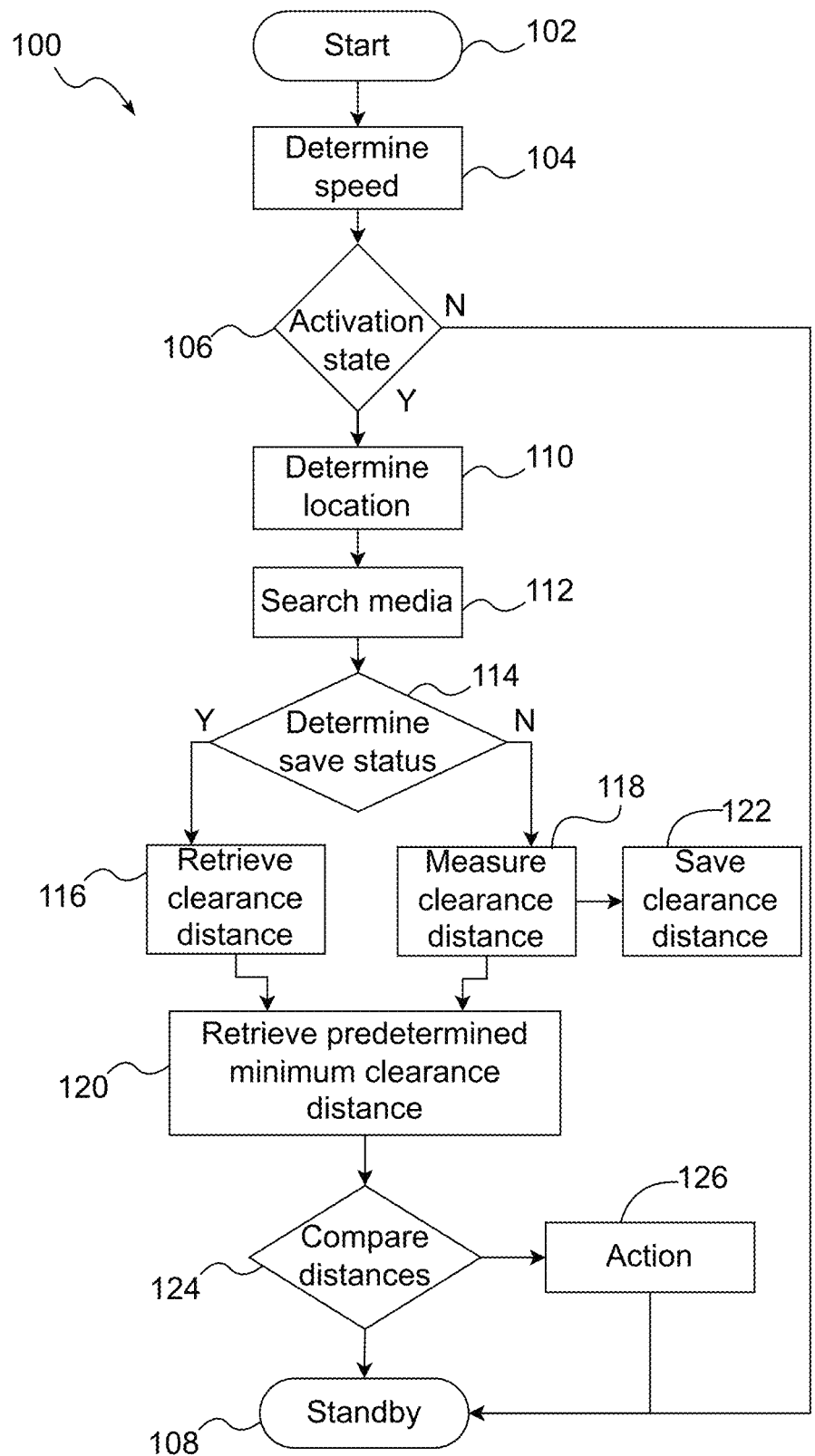
FIG. 3 is a flowchart of a method for enhancing occupant awareness for a vehicle according to an exemplary embodiment.

Referring to FIG. 3, a flowchart of the method 100 for enhancing occupant awareness for a vehicle is shown. The method 100 begins at block 102 and proceeds to block 104. At block 104, the controller 14 determines a speed of the vehicle 12. After block 104, the method 100 proceeds to block 106. At block 106, the controller 14 determines an activation state of the system by comparing the speed of the vehicle 12 determined at block 104 to a predetermined vehicle speed threshold (e.g., five kilometers per hour). If the speed of the vehicle 12 greater than the predetermined vehicle speed threshold, the activation state is the deactivated state, and the method 100 proceeds to enter a standby state at block 108. If the speed of the vehicle 12 is less than or equal to the predetermined vehicle speed threshold, the activation state is the activated state, and the method 100 proceeds to block 110.

At block 110, the controller 14 determines a geographical location of the vehicle 12 using the GNSS 18. After block 110, the method 100 proceeds to block 112.

At block 112, the controller 14 searches the media 24 of the controller 14. In an exemplary embodiment, the media 24 contains a database having a plurality of records, each of the plurality of records having a location field and clearance distance field. Therefore, at block 112, the controller 14 searches the media 24 of the controller 14 to determine whether the clearance distance 36 corresponding to the location of the vehicle 12 determined at block 110 is saved in the media 24. After block 112, the method 100 proceeds to block 114.

At block 114, the controller 14 determines a save status of the clearance distance 36 in the media 24. If the clearance distance 36 corresponding to the geographical location of the vehicle 12 is found in the media 24 at block 112, the save status is the saved status, and the method 100 proceeds to block 116. If the clearance distance 36 corresponding to the geographical location of the vehicle 12 is not found in the media 24 at block 112, the save status is the unsaved status, and the method 100 proceeds to block 118.

At block 116, the controller 14 retrieves the clearance distance 36 from the media 24 based on the geographical location of the vehicle 12. After block 116, the method 100 proceeds to block 120.

At block 118, the controller 14 uses the ranging sensor system 16 to measure the clearance distance 36 of the obstacle 34. In an exemplary embodiment where the ranging sensor system 16 includes a surround view camera system, at least one of the first side-view camera 26b affixed to the first side-view mirror 28a and the second side-view camera (not shown) affixed to the second side-view mirror 28b is used to capture a first image of an environment surrounding the vehicle 12 including at least a portion of the main body 30 of the vehicle 12 and the obstacle 34. In a non-limiting example, the controller 14 uses one or more reference points on the portion of the main body 30 of the vehicle 12 included in the first image and a computer vision algorithm to determine the clearance distance 36. In another non-limiting example, the controller 14 uses a machine learning model which has been trained to determine distances to objects based on images from the surround view camera system.

In another exemplary embodiment, the controller 14 additionally captures a second image using the front-facing camera 26a. In a non-limiting example, the clearance distance 36 is determined based on both the first and the second images using, for example, a computer vision algorithm and/or a machine learning algorithm. In another exemplary embodiment, the clearance distance 36 is determined based on at least one of the first and second images using a mathematical formula. In a non-limiting example, the mathematical formula determines distances based on various characteristics of the surround view camera system (e.g., sensor size, lens focal length, and the like) and a number of pixels which comprise the desired distance in the first and/or second image. It should be understood that additional computer vision techniques such as, for example, perspective distortion, feature matching, depth from focus, and/or triangulation are within the scope of the present disclosure.

In yet another exemplary embodiment, the controller 14 additionally determines whether the first and/or second image is sufficient to determine the distance. For example, if the first and/or second image is obstructed by dirt or debris, or the scene is not sufficiently lit, the first and/or second image is insufficient to determine the distance. Therefore, the first and/or second image may be recaptured, or the method 100 may enter the standby state 108. In a non-limiting example, to determine whether the first and/or second image is sufficient, the controller 14 uses a computer vision algorithm and/or a machine learning algorithm. After block 118, the method 100 proceeds to blocks 122 and 120.

At block 122, the controller 14 saves the clearance distance 36 determined at block 118 to the media 24 of the controller 14 with the corresponding geographical location determined at block 110. Therefore, in the future, the clearance distance 36 corresponding to the geographical location may be retrieved from the media 24 of the controller 14 as described above in reference to block 116. After block 122, the method 100 proceeds to block 120.

At block 120, the controller 14 retrieves the predetermined minimum clearance distance 32 from the media 24 of the controller 14. As discussed above in reference to FIG. 2, the predetermined minimum clearance distance 32 is the distance by which the first and second side-view mirrors 28a, 28b protrude from the main body 30 of the vehicle 12. After block 120, the method 100 proceeds to block 124.

At block 124, the controller 14 compares the clearance distance 36 between the vehicle 12 and the obstacle 34 determined at block 116 or block 118 to the predetermined minimum clearance distance 32 retrieved at block 120. If the clearance distance 36 is greater than the predetermined minimum clearance distance 32, the method 100 proceeds to enter the standby state at block 108. If the clearance distance 36 is less than or equal to the predetermined minimum clearance distance 32, the method 100 proceeds to block 126.

At block 126, the controller 14 takes an action to increase occupant awareness. In an exemplary embodiment, the controller 14 uses the display 20 to display a notification to the occupant. In a non-limiting example, the notification includes text warning the occupant that a collision with the obstacle 34 is possible and prompting the occupant to fold the first and second side-view mirrors 28a, 28b. In another exemplary embodiment, the controller 14 additionally uses the loudspeaker of the display 20 to provide an audible warning to the occupant. In yet another exemplary embodiment, the controller 14 commands the first and second side-view mirror movement motors to fold the first and second side-view mirrors 28a, 28b. After block 126, the method 100 proceeds to enter the standby state at block 108.

The system 10 and method 100 of the present disclosure offer several advantages. For example, when maneuvering the vehicle 12 in low-width environments, such as, for example, a garage, the occupant may be unaware of a risk the first and second side-view mirrors 28a, 28b colliding with obstacles in the environment, such as, for example, a doorframe of the garage. For example, when reversing a vehicle out of a garage, the occupant may primarily focus on avoiding obstacles in a path behind the vehicle 12 and may be unaware that the clearance distance 36 between the vehicle 12 and the doorframe of the garage is less than the predetermined minimum clearance distance 32. Using the system 10 and the method 100, the occupant is notified, increasing occupant awareness and mitigating risk of damage to the vehicle 12.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for enhancing occupant awareness for a vehicle, the system comprising:
a display for displaying information to an occupant of the vehicle;
a global navigation satellite system (GNSS) for determining a geographical location of the vehicle; and
a controller in electrical communication with the display and the GNSS, wherein the controller is programmed to:
determine an activation state of the system, wherein the activation state includes an activated state and a deactivated state;
determine the geographical location of the vehicle using the GNSS;
determine a save status of a clearance distance in a non-transitory memory of the controller in response to determining that the activation state is the activated state, wherein clearance distance is a distance between the vehicle and an object in an environment surrounding the vehicle, wherein the save status is determined based on the geographical location of the vehicle, and wherein the save status includes a saved status and an unsaved status; and
retrieve the clearance distance from the non-transitory memory of the controller in response to determining that the save status is the saved status;
display a notification to the occupant of the vehicle based at least in part on the clearance distance; and
fold at least one of: a side-view mirror and a side-view camera of the vehicle based at least in part on the clearance distance.

2. The system of claim 1, wherein to determine the activation state of the system, the controller is further programmed to:
determine a speed of the vehicle;
compare the speed of the vehicle to a predetermined vehicle speed threshold; and
determine the activation state of the system to be the activated state in response to determining that the speed of the vehicle is less than or equal to the predetermined vehicle speed threshold.

3. The system of claim 1, wherein the system further includes a ranging sensor system for measuring distances, wherein the ranging sensor system is in electrical communication with the controller, and wherein to determine the clearance distance, the controller is further programmed to:
measure the clearance distance using the ranging sensor system in response to determining that the saved status is the unsaved status.

4. The system of claim 3, wherein the ranging sensor system includes a side-view camera affixed to a side-view mirror of the vehicle, and wherein to measure the clearance distance, the controller is further programmed to:

capture a first image of the environment surrounding the vehicle using the side-view camera; and determine the clearance distance based at least in part on the first image.

5. The system of claim 4, wherein the ranging sensor system includes a front-view camera affixed to a front of the vehicle, and wherein to measure the clearance distance, the controller is further programmed to:

capture a second image of the environment surrounding the vehicle using the front-view camera; and determine the clearance distance based on at least one of: the first image and the second image.

6. The system of claim 3, wherein the controller is further programmed to:

save the clearance distance determined using the ranging sensor system and the corresponding geographical location of the vehicle in the non-transitory memory of the controller.

7. The system of claim 1, wherein to display the notification to the occupant of the vehicle, the controller is further programmed to:

compare the clearance distance to a predetermined minimum clearance distance threshold, wherein the predetermined minimum clearance distance threshold is a distance is a distance by which at least one of: the side-view mirror and the side-view camera protrudes from a main body of the vehicle; and display the notification to the occupant of the vehicle in response to determining that the clearance distance is less than or equal to the predetermined minimum clearance distance threshold.

8. The system of claim 7, wherein to fold at least one of: the side-view mirror and the side-view camera, the controller is further programmed to:

fold at least one of: the side-view mirror and the side-view camera of the vehicle in response to determining that the clearance distance is less than or equal to the predetermined minimum clearance distance threshold.

9. The system of claim 7, wherein the controller is further programmed to:

provide an audible warning to the occupant of the vehicle in response to determining that the clearance distance is less than or equal to the predetermined minimum clearance distance threshold.

10. A method for enhancing occupant awareness for a vehicle, the method comprising:

determining an activation state, wherein the activation state includes an activated state and a deactivated state;

determining a clearance distance between the vehicle and an object in an environment surrounding the vehicle in response to determining that the activation state is the activated state, wherein determining the clearance distance further comprises:

determining a geographical location of the vehicle using a global navigation satellite system (GNSS);

determining a save status of the clearance distance in a non-transitory memory of a controller based on the geographical location of the vehicle, wherein the save status includes a saved status and an unsaved status;

retrieving the clearance distance from the non-transitory memory of the controller in response to determining that the save status is the saved status; and measuring the clearance distance using a ranging sensor system in response to determining that that save status is the unsaved status;

displaying a notification to an occupant of the vehicle based at least in part on the clearance distance; and folding at least one of: a side-view mirror and a side-view camera of the vehicle based at least in part on the clearance distance.

11. The method of claim 10, wherein determining the activation state further comprises:

determining a speed of the vehicle;

comparing the speed of the vehicle to a predetermined vehicle speed threshold; and determining the activation state to be the activated state in response to determining that the speed of the vehicle is less than or equal to the predetermined vehicle speed threshold.

12. The method of claim 10, further comprising:

saving the clearance distance determined using the ranging sensor system and the corresponding geographical location of the vehicle in the non-transitory memory of the controller.

13. The method of claim 10, wherein the ranging sensor system includes a camera system, and wherein the camera system includes at least one of: a side-view camera and a front-view camera.

14. The method of claim 10, wherein displaying the notification to the occupant of the vehicle further comprises:

comparing the clearance distance to a predetermined minimum clearance distance threshold; and displaying the notification to the occupant of the vehicle in response to determining that the clearance distance is less than or equal to the predetermined minimum clearance distance threshold.

15. The method of claim 14, wherein folding at least one of: the side-view mirror and the side-view camera of the vehicle further comprises:

folding at least one of: the side-view mirror and the side-view camera of the vehicle in response to determining that the clearance distance is less than or equal to the predetermined minimum clearance distance threshold; and providing an audible warning to the occupant of the vehicle in response to determining that the clearance distance is less than or equal to the predetermined minimum clearance distance threshold.

16. A system for enhancing occupant awareness for a vehicle, the system comprising:

a display for displaying information to an occupant of the vehicle;

a global navigation satellite system (GNSS) for determining a geographical location of the vehicle;

a ranging sensor system for measuring distances; and a controller in electrical communication with the display, the GNSS, and the ranging sensor system, wherein the controller is programmed to:

determine a speed of the vehicle;

compare the speed of the vehicle to a predetermined vehicle speed threshold;

determine an activation state of the system to be an activated state in response to determining that the speed of the vehicle is less than or equal to the predetermined vehicle speed threshold;

determine a clearance distance between a main body of the vehicle and an object in an environment surrounding the vehicle in response to determining that the activation state is the activated state;

determine a geographical location of the vehicle using the GNSS;

determine a save status of a clearance distance in a non-transitory memory of the controller in response to determining that the activation state is the activated state, wherein clearance distance is a distance between the vehicle and an object in an environment surrounding the vehicle, wherein the save status is determined based on the geographical location of the vehicle, and wherein the save status includes a saved status and an unsaved status; and retrieve the clearance distance from the non-transitory memory of the controller in response to determining that the save status is the saved status;

measure the clearance distance using the ranging sensor system in response to determining that that save status is the unsaved status; and save the clearance distance determined using the ranging sensor system and the corresponding geographical location of the vehicle in the non-transitory memory of the controller in response to measuring the clearance distance;

compare the clearance distance to a predetermined minimum clearance distance threshold, wherein the predetermined minimum clearance distance threshold is a distance is a distance by which at least one of: a side-view mirror and a side-view camera protrudes from the main body of the vehicle;

display a notification to the occupant of the vehicle in response to determining that the clearance distance is less than or equal to the predetermined minimum clearance distance threshold; and fold at least one of: the side-view mirror and the side-view camera of the vehicle in response to determining that the clearance distance is less than or equal to the predetermined minimum clearance distance threshold.

17. The system of claim 16, wherein the controller is further programmed to:

provide an audible warning to the occupant of the vehicle in response to determining that the clearance distance is less than or equal to the predetermined minimum clearance distance threshold.

* * * * *